United States Patent Office 2,813,020
Patented Nov. 12, 1957

2,813,020

PRECIPITATION OF ELEMENTAL METAL POWDER

George Frederick Van Hare, Jr., North Kansas City, Mo., assignor to American Cyanamid Company, New York, N. Y., a corporation of Maine No Drawing. Application December 22, 1955,
Serial No. 554,638

18 Claims. (Cl. 75—109)

This invention relates to an improved chemical precipitation of powdered, elemental metal, usually copper, by treating an aqueous ammoniacal solution of a compound of such metal with a reducing gas at an elevated temperature under super-atmospheric pressure. More particularly, the improvement is directed to a combined process of pretreating an aqueous ammoniacal-ammonium salt solution containing the metal salt to obtain the best result during reduction, carrying out the reduction under controlled conditions, removing precipitated metal and reusing the end liquor. Still more specifically, the improved combination permits a cyclic process to be continuously operated with the production in each cycle of uniform high-grade metal powder.

Ores, ore concentrates, secondary metals and other commercial sources of non-ferrous metals usually contain a variety of metal values whose recovery and/or purification by known hydrometallurgical methods is difficult. One method heretofore proposed is the use of some selective leaching liquor for a particular metal-bearing component. Leaching is to be followed by treatment of resultant solution with a reducing gas at elevated temperature and pressure to precipitate the desired metal in elemental form. Both acidic and ammoniacal solutions have been proposed as leaching liquors. In some few cases acceptable results have been obtained.

Unfortunately, leaching is never perfectly selective and various amounts of other metals and impurities also dissolve. In subjecting resultant solution to reduction at the necessary temperature and pressure, the precipitated metal product too often is found contaminated by co-precipitated metal and/or metal compounds. As a result, various proposals for selective precipitation of the desired metal also have been made. Many have been found useful in special fields. None have been wholly satisfactory for all purposes. In some cases, the product of the reduction step is not sufficiently pure, in others, its physical characteristics have been unsatisfactory. Particularly is this true of attempts to adapt these procedures for continuous production of such metals as copper, nickel and cobalt.

From an industrial point of view, perhaps one of the most troublesome problems has been the frequency with which the physical properties of the metal product may change in successive cycles. Precipitated metal can be produced in several forms, as for example: (1) a "plate" or "mirror" which adheres firmly to the reduction vessel, cannot be discharged and is therefore undesirable; (2) a desirable discrete powder of the desired density and particle size range which is readily discharged; or (3) massive metal powder accumulations which cannot be discharged. A process may repeatedly yield a satisfactory powder of the second type and then, in the next cycle produce a bad product. The third type, which fouls the apparatus and causes down time for cleaning the overall circuit, is particularly objectionable.

It is, therefore, a primary object of the present invention to develop a reduction procedure by which it is possible to substantially reduce or present such difficulties. Such a process should be capable of repeated operation without the necessity for closing down the circuit for cleaning. In addition, the product metal from each reduction operation must be of satisfactory purity and physical property.

It is believed that these objects have been successfully accomplished. A reduction process has been found which can be used repeatedly in a closed circuit to produce uniform results. The overall process or circuit may be considered as combining several unitary operations. These may be designated as:

(1) Dissolving the metal-of-interest by leaching;
(2) Pretreatment to stabilize the solution and remove undesirable constituents;
(3) Adjustment of the solutes content;
(4) The actual reduction and product removal; and
(5) Further use of the end liquor.

As thus broadly stated, not only can it be said that these operations are known per se but also the combination of some of them. However, the primary objects of this invention have been accomplished with particular reference to modifications in the fourth or reduction step. Nevertheless, alterations in one step will alter the others and the whole circuit must be balanced. Each step is so operated as to permit the novel feature of the present invention to be carried out in the reduction step and the improved overall operation to be obtained.

Briefly, the reduction operation may be described by the following features. Being intended for cyclic use, a slurry comprising a known volume, usually small, of reduced liquor and powdered metal is retained in the reduction vessel after each cycle. To this is added a known volume of heat-stabilized pregnant leach liquor of known solutes content. This added volume is such that when the two volumes of liquor are combined as a composite, the latter also has a definite solute content such that on heating to reduction temperature several controlled results are produced.

The composite will have an initial content of dissolved metal-of-interest approaching, but not equalling, the saturation value at reduction temperature. Therefore, retained precipitated elemental metal will dissolve, first to achieve saturation, then to cause precipitation of very finely-divided, suspended solids, and, finally, in amount sufficient to cause precipitation of the solids in the correct amount to insure that reaction with reducing gas is effectively initiated and continued. Reducing conditions are maintained until the correct amount of metal of interest has precipitated.

Under these conditions, properly controlled and maintained, reduction to elemental metal can be repeatedly and successively carried out to obtain the desired product. It can be seen, however, that the statement above that all of the five listed operations must be balanced is justified. This will be more fully discussed below. Before doing so, however, several general points should be noted.

First of all, the present invention while having a number of broad aspects, is not, and is not intended to be, universally applicable. For example, it does not apply to all metals. The present invention is concerned only with production and/or recovery of those metals between silver and cadmium, inclusive, in an electromotive force series which are capable of forming in aqueous solution a water-soluble complex with $NH_3$. Such metals can be precipitated in elemental form from solutions of compounds thereof by treatment under superatmospheric temperature and pressure conditions with a suitable reducing gas such as carbon monoxide or hydrogen.

Actually, the practice of the present invention will usually be encountered in the production of copper, less often of cobalt and nickel and seldom for other metals. Difficulties in utilizing previously suggested practices and which are solved by the present invention, are readily illustrated in the production and/or recovery of these metals. Application of the process to one such metal, copper for example, therefore, will be discussed for illustrative purposes in somewhat greater detail.

Problems solved by the present invention may be encountered in conjunction with quite widely varied solutions. Ordinarily, solutions other than aqueous will not be met. Such aqueous solutions may have acidic or substantially neutrally hydrogen ion concentrations. However, basic ammoniacal liquors will be most commonly encountered. Moreover, although the dissolved metal compounds may be simple or complex salts of various acid radicals, as to the latter usually only carbonates and sulfates will be commonly encountered. In considering copper as the illustrative metal, it will be found that the difficulties encountered are most pronounced in dealing with circuits using aqueous ammoniacal-ammonium carbonate leach liquors. Accordingly, to further simplify the present discussion, an illustrative case will be taken to be the processing found in the commercial production of copper, using aqueous ammoniacal-ammonium carbonate liquors.

With these facts in mind, the five operations listed above should be considered as to their relation to the illustrative case. Although as was noted above, reduction process per se is considered to start with a slurry residue from the reduction step in a previous cycle, it is simpler to consider the overall circuit as starting with the first listed operation, namely that of leaching the metal of interest.

The leaching operation

In general, the mechanics of leaching are well known. Some copper-bearing material is leached with an ammoniacal-ammonium carbonate liquor. This material may be, for example, a concentrate of copper ore, or a scrap metal or alloy such as brass, bronze or the like. However, the novelty of the present invention is not in the actual leaching steps per se. For copper recovery, a good leaching practice is shown in U. S. Patent No. 2,647,830.

Nevertheless, some special considerations should be noted because in a closed circuit, the leaching step utilized at least some recycle liquors. As noted above, conditions throughout the whole circuit are planned for optimum reduction. Therefore, the pregnant leach liquor should have as high content as practicable of the metal of interest, but should not be saturated therewith. Accordingly, the liquor used for leaching should be one which in the leaching cycle will permit this result to be obtained.

It is desirable that copper should be present in the pregnant liquor to about 110–135 grams per liter or more. To insure this metal content being soluble, a good average practice is to provide some 10 mols per liter of ammonia and 2.5 mols per liter of carbon dioxide as ammonium carbonate, i. e., some 160–210 g./l. of $NH_3$ and 100–200, usually about 100–125 g./l. of $CO_2$. Some cupric copper is necessary to secure leaching; at the start it should be present in at least about 20 g./l. Cuprous copper may be present in varying amount. At the end of leaching, the cupric:cuprous ratio also may but some 20 g./l. is again a desirable minimum. Since cupric copper compounds are generally both more soluble and more stable, and since oxygen is usually present during leaching, in both cases the cupric content is usually as high as practicable. It may be as high as 100% of the dissolved copper, particularly before leaching.

Since the leaching rate is affected by temperature, it is desirable that leaching be done in a closed vessel so that increased temperature may be used without ammonia losses being excessive. Preferably, but not necessarily, the leaching temperature should be from about 35° to about 55° C., with about 48°–50 C., being good practice.

The leaching time should be adjusted to provide the amount of pregnant liquor needed to balance the circuit. The initial dissolved copper content and the leaching rate should be so adjusted with respect to the leach tank volume as to provide this result in the leaching time available. The initial copper content will therefore usually be from about 20 g./l. to about 70 g./l., with some 50–65 being good practice.

The purification and stabilizing operation

Whatever the actual mechanics of the leaching operation, the resulting solution is one containing dissolved complex metal and ammonium carbonates. Copper, for example, is believed to form in typical leach liquors an ammine salt which can be considered as of the type $Cu(NH_3)_xCO_3$ where $x$ may vary but generally is about two. In addition such complex metal-ammonium compounds, resultant pregnant leach solutions will also contain uncombined ammonia and ammonium carbonate.

In the illustrative case of copper ammine carbonates solutions, other metals or metal compounds also may be present. In treating scrap copper, however, only copper, and zinc if zinc is present, will be leached to an extent approaching complete extraction. Particularly when treating ores, nickel and cobalt may be present. If so, they will be leached, but more slowly. Much, if not most of such other feed contaminants as tin, lead, manganese, silica, and the like remain in the leach tank as undissolved sludge due to lower salt solubilities and/or solution rates. If so desired, this sludge may be removed and further treated.

Nevertheless, pregnant leach solution as decanted or otherwise taken from the leaching operation will contain appreciable amounts of dissolved "other" metals or metal compounds. Usually, also, some suspended fine particles are present. For example, enough lead or lead salts are usually colloidally suspended to give the liquor an apparent lead content greatly in excess of the expected lead salt solubility. Unless prevented, such matter may cause during reduction the precipitation of a metal product in which the contaminant content is excessive.

Perhaps the best treatment for this purpose is shown in my copending application with Montgomery for U. S. Letters Patent Serial No. 315,341, filed October 17, 1952. As proposed therein, the ammonia and ammonium salt contents are adjusted to hold in solution, at the reduction temperature, the optimum amount of the metal of interest, illustratively here the copper. Adjusted solution is then heated in the absence of reducing gas to about reduction temperature. Colloidally suspended particles are coagulated and precipitated along with any metal compounds in excess of the amount soluble at reduction temperature. Resultant precipitate is removed and clarified liquor is then subjected to reducing gas to obtain the metal product, i. e., the copper metal powder.

Treatment by this combined adjusting, heating and clarifying operation not only removes contaminants but also in some way stabilizes the solution for some time against the precipitation of copper oxide which otherwise occurs on holding at elevated temperatures solutions of above about 90 g./l. copper content. Preferably, but not necessarily, heated liquor is both clarified and sent to reduction with a minimum of heat loss, both for economy and to insure against any redissolving of suspended solids.

Too much dissolved zinc may be undesirable in the liquor during leaching. This is discussed below in connection with reduction end liquor treatment.

Where in addition to copper, other metals such as cadmium, nickel or cobalt are present with copper to an appreciable extent, conjoint precipitation is undesirable. This problem may be dealt with by selective reduction or by precipitation of all or part of them as some compound such as an oxide or sulfide. Nickel and cobalt when only dissolved to dilute amounts may also be effectively concentrated by selective precipitation of some compound thereof and then releaching the precipitate. There are known methods for these purposes which are not part of this invention.

In any case, a clarified solution is obtained which is heat stabilized and with the possible exceptance of zinc salts contains substantially only salts of the metal of interest, again illustratively the copper. It is preferably hot and preferably, but not necessarily, only some 5°–10° C. below the intended reduction temperature. It should contain, if practicable, some 100–150 g./l. of copper, preferably about 130–135 g./l., of which up to about 100–120 g./l. may be and usually is in the cuprous condition. The ammonia and ammonium carbonate contents will have been adjusted so that the solution is concentrated but not quite saturated in total copper. Its dissolved content may vary in different cases but its constitution will be known and will be substantially constant for any one continuous cyclic operation.

The reduction operation

In the reduction operation of the present invention several novel characteristics may be observed. They all stem from the discovery of the present invention that while seeding the operation with metal powder is often desirable for optimum operation as discussed in the Canadian Letters Patent No. 514,814, the metal-powder itself does not necessarily act per se as the seeding agent. According to the present invention, it has been found, for example, that retained copper powder does not so act. Instead such metal powder is redissolved and reprecipitated as cuprous oxide. This in turn is reduced by the reducing gas to finely divided copper which appears to act as the activating agent necessary to produce copper powder of the required particle size and density.

Moreover, it has been found that this cuprous oxide must be formed in the correct amount. This is in general from about two to about ten g./l., preferably averaging about 5 g./l. Still further, the cuprous oxide should be sufficiently fine to remain easily suspended in the liquor and should be substantially uniformly dispersed therethrough. Otherwise, the copper obtained by reducing the oxide is not sufficiently fine or suitably dispersed.

To meet these requirements, it has been found necessary in this invention that the oxide be formed in situ as needed. This means that sufficient copper metal powder left in the reduction vessel as "seed" must be available at the beginning of the reduction cycle in at least the minimum correct amount. This is a function of the amount of copper metal powder needed to produce, when dissolved, a solution saturated in copper at the reduction temperature, whereby cuprous oxide is precipitated. The amount provided also must include a sufficient amount to keep the solution saturated in copper, with resultant precipitation of cuprous oxide, until the correct amount of oxide has been formed.

This is not an idle speculation. The initial copper content charged to reduction may be excessive for several reasons. For example, the initial copper in the charge liquor may be too high and/or the amount of copper metal powder provided may be too great. If so, the reduction will be unsatisfactory. Initial precipitation of too much cuprous oxide will result in the metal product comprising large metal powder agglomerates firmly adhering to the internal surfaces of the reduction vessel. This must be avoided.

If a smaller, but still overlarge, amount of cuprous oxide is discharged, on the introduction of reducing gas a different but also objectionable result is produced. The product copper powder is of extremely fine particle size and very low apparent density.

When small but approximately correct amounts are discharged, the product powder is of relatively large particle size and high apparent density. Only a slight deficiency, however, will cause slightly larger and more dense powder. This latter is suitable for some but not all purposes. Finally, the amount of cuprous oxide is completely inadequate, the product is a useless plate on the inner walls of the vessel.

The product also differs somewhat in size and density with the reducing gas used. In general, CO gives products which are larger and more dense than those obtained with $H_2$. A summary of the approximate effect of these gases when the amount of cuprous oxide varies is shown in the following table.

| Wt. of $Cu_2O$ (g./l.) | Adequacy of $Cu_2O$ | $H_2$ Density Average (gms./cc.) Mesh Size | CO Density Average (gms./cc.) Mesh Size |
|---|---|---|---|
| 0–2 | deficient | plating | plating |
| 2–4 | slight deficiency | 1.8–2.5  +200 | 3.5–4+100 |
| 4–7 | good | 1.2–1.8  −200 | 2–3  −100 |
| 7–10 | excess | 0.8–1.2  −325 | 1.5–2  −200 |
| +10 | large excess | large agglomerates deposited | |

The choice of reducing gas, therefore, is an available additional control in obtaining the product in the desired physical condition.

Provision of copper metal powder to be dissolved to produce cuprous oxide is therefore essential. It is most convenient to use a "heel" from a previous cycle. In discharging the reduction vessel a slurry comprising the desired amount of copper metal powder and reduced liquor is easily left behind by adjustment of the usual dip pipe. However, if so desired, the necessary copper can be otherwise provided. It is only necessary that it be provided in some manner when the stabilized liquor is added to the reduction vessel.

Although the provision of the additional copper as copper metal powder by retaining a "heel" is a convenient procedure, it is not necessary to introduce solid copper into the reduction vessel. There is considerable difference in total copper solubility for any one solution at different temperatures. Therefore, it is possible to make up a solution at ambient temperatures which contains more cuprous copper than can be retained at reduction temperatures. Such solution can be added to leach liquor in sufficient quantity to produce the necessary total copper charged to the autoclave. In fact, if for some reason the stabilized solution is allowed to cool appreciably for some reason, additional copper as metal powder or otherwise can be dissolved therein before it is pumped to the preheater and/or the reduction vessel.

In the foregoing discussion, it has been presumed that usually the copper metal powder to be redissolved is provided in controlled predetermined amounts. In this way, a limit can be placed on the amount of copper which will redissolve when the vessel is charged. While this method is preferred, there is another good alternative which may be desirable in some cases. The amount of copper which can be dissolved is also a function of the amount of cupric copper available to dissolve copper metal. Since cupric salts are more soluble than the cuprous, a liquor may be used which at about reduction temperature is nearly but not wholly saturated in cuprous copper but also contains enough cupric copper to dissolve the predetermined amount of copper metal without being saturated in total copper. In this procedure, the cupric content of the liquor is controlled to a determined amount and copper metal may be present in the vessel in excess. This is in contrast with the preferred method wherein the cupric content is any random amount above the necessary figure and cuprous oxide control is gained by controlling the amount of copper metal available.

Economic factors are adverse if the total dissolved copper content of the leach liquor is too low. It should be above about 110 g./l. The ammonia and ammonium carbonate contents are controlled, usually by controlling the amount furnished during leaching. Added $NH_3$ and $CO_2$ may be provided at any stage if necessary. The values at which the $NH_3$ and $CO_2$ contents are controlled include the small excess amounts which will make the solution concentrated but not quite saturated in total dissolved copper. A good practice is to maintain the ammonia and ammonium salt contents at levels to provide saturation at about 135 g./l. copper but to maintain a stabilized liquor containing about 130 g./l. copper.

This solutes control must be quite precise. A good practice is to maintain the several contents at about the indicated values, plus or minus about two g./l. In the case of a 130 g./l. copper solution which will be saturated at 135 g./l., the copper content should not vary more than about plus five or minus three g./l. from the optimum. If this control is allowed to vary too greatly, the amount of copper metal powder to be dissolved cannot be accurately estimated and the reduction process results will vary. The necessary correct amount of cuprous oxide will not be discharged, nor will the requisite corresponding amount of finely-divided copper be formed in situ.

A good stabilization temperature should approximate or slightly exceed the reduction temperature. Not less than 10°–15° C. below reduction temperature is preferred. A good practice, wherever possible, is to preheat the solution to and stabilize it at about the reduction temperature. Thereby, not only is stability assured at reduction temperature but allowance is made for heat losses in transfer and/or storage. The operator also is enabled to charge the reduction vessel with liquor at approximately the temperature to be used during reduction.

As to the reduction temperature itself, a somewhat lower range is preferable when using CO than when using $H_2$. Because of the high partial pressures of $NH_3$ and $CO_2$ involved, any unnecessary elevation in temperature should be avoided because the solution must be kept under a pressure at least equal to that autogenously developed. A good temperature range using CO is from about 150° to about 170° C., preferably about 160°–164° C. Using $H_2$, a good range will be about 170°–180° C., averaging about 175°–180° C.

Obviously, these ranges can be extended in either direction if necessary. Too low temperatures are too slow. The upper temperature is limited by the pressure which the apparatus can stand. Any positive partial pressure of reducing gas which can be maintained will be adequate. However, if this partial (and therefore the total pressure) pressure is too low the reaction rate is slow, if too high, the pumping costs are excessive. A good operating practice is to maintain a total pressure above the autogenous but less than about 1000 p. s. i.

Reduction ordinarily should not be carried to complete copper precipitation. To do so makes it more difficult to maintain product purity. Moreover, some 20–75 g./l., preferably above 50 g./l., of dissolved copper is desirable when the liquor is returned to leaching in the next cycle. Therefore, reduction is usually stopped at some residual dissolved copper content of at least 20 g./l. and preferably from about 50 to about 70 or 75 g./l. of copper.

Precipitation of copper is followed by discharge of the slurry, cooling, collection and washing of the metal powder product and recycling of the end liquor. All of these latter operations may be done in any desired known manner.

A summary of the essential features of the novel reduction process features may be said therefore to include the following.

(1) Use of preheated, clarified, stabilized feed liquor.
(2) Charging to reduction a known amount of heated concentrated solution of known metal content just insufficient to be saturated in total dissolved metal.
(3) Dissolving, during charging or at the start of the reduction steps, metal in amount sufficient to saturate the solution and discharge only the requisite amount of meta oxide. For metals having several possible valence conditions, this oxide should be of metal in the lower valent state. In the illustrative case, this will be some 2–10 g./l. of suspended cuprous oxide.
(4) Reduction of suspended metal oxide to provide in situ finely-divided, suspended metal which serves as the actual reduction promoter.
(5) Carrying out the reducing reaction with $H_2$ or CO at an elevated temperature and under at least some excess over the autogenously developed pressure.
(6) Usually, also, stopping the reduction at a predetermined residual dissolved metal content. In the illustrative copper case, some 20–75 g./l. of copper.
(7) Preferably providing metal powder for the next cycle by discharging from the vessel all but the amount of metal to be dissolved by the next charge of preheated stabilized liquor.
(8) Recycling the residual reduction end liquor.

*End liquor reuse*

In many instances, after reduction, the end liquor may be recycled directly to the leaching circuit, once the product metal has been removed therefrom. The $NH_3$ and $CO_2$ contents can and should be built up to ranges found desirable in accordance with the foregoing discussion. Usually at least some of the liquors from product metal washings also are recycled.

One feature, however, must be considered when producing a copper or other product from a feed containing zinc. The total solubility of copper plus zinc at about the usual preferred reduction temperature range is about 160 g./l. Therefore, since zinc does not precipitate with copper, if it is present in the feed, and dissolves with copper as noted above, the dissolved zinc must presently exceed some 50 g./l. and thereafter some zinc must then be discharged or the solubility of copper will fall below this 110 g./l. limit noted above.

Perhaps the best method for handling this problem is that shown in my co-pending application with Kunz for United States Letters Patent, Serial No. 553,414, filed December 16, 1955. Therein is shown a method of recovering zinc from conjoint solution with copper. Briefly, the method consists in volatilizing $NH_3$ and $CO_2$ from the solution at atmospheric pressure until the residual $NH_3$ and $CO_2$ contents are just in excess of those required to solubilize the dissolved copper. However, water also volatilizes during this treatment and as noted in that application at a rate found excessive. It was found desirable to return water at the rate of about three pounds for about each five pounds evaporated. Where in the overall circuit of the present invention, the presence of dissolved zinc creates a similar problem, it is desirable that this procedure be utilized to hold the dissolved zinc content within permissible bounds.

It is believed that the foregoing discussion has shown the reduction operation which is novel here and the manner in which the other steps of the circuit are adjusted to insure optimum results when that reduction operation is used. However, the operation may be further illustrated in conjunction with the following discussion of a typical operation. This discussion, however, is intended as illustrative only.

To a closed leaching tank is charged some 13,100 pounds of copper scrap containing some 350 pounds of zinc and 12,750 pounds of copper. Leaching is done with about 12,000 gallons of leaching liquor made up in part of recycle end liquor and containing about 11,000 lbs. of carbon dioxide as ammonium carbonate and 16,500 lbs. of $NH_3$. Ammonia and carbon dioxide are supplied at about 10 mol/l. and 2.5 mol/l. respectively.

With recycled dissolved copper and zinc, the liquor as charged has the following average analysis:

| Content: | Weight (g./l.) |
|---|---|
| Copper (total) | 65 |
| Zinc (approx.) | 18.5 |
| $CO_2$ | 110 |
| $NH_3$ | 165 | with the $CO_2$ and $NH_3$ contents being maintained at ±2 g./l.

The charge is maintained at about 120° F. and liquor is circulated through the tank at about 1000 G. P. M. while supplying compressed air at about 350 s. c. f. m. for about the first three hours. Circulation is continued until about 6000 lbs. of copper is dissolved. Thereafter solution is discharged by decantation and the tank recharged with fresh liquor. Additional scrap is added with each alternate charging. Leaching is continued until the withdrawn liquor contains approximately;

| | G./l. |
|---|---|
| Total copper | 130 |
| Cuprous copper | 100 |
| Zinc | 20 | the $CO_2$ and $NH_3$ analysis being substantially as fed and the zinc content change being negligible at this stage.

Decanted liquor is passed through a heat exchanger wherein its temperature is caused to be raised to about 350° F. (177°–178° C.) (vapor pressure about 275–285 p. s. i.) and filtered hot to remove sediment; about 2–10 lbs. being collected in each cycle. Resultant clarified and stabilized liquor is sent to storage.

Reduction is carried out in a stirred 2500 gallon autoclave maintained at about 325°–350° F. During charging the vessel is maintained under about 300–350 p. s. i. with hydrogen. About 50 gal. of reduced liquor and 100 lbs. of copper metal powder is retained after each run. About 2000 gal. of stabilized liquor is withdrawn from storage and pumped against autoclave pressure (300–350 p. s. i.) through a preheater and into the autoclave at about 325° F. After about 5 minutes agitation, the pressure is raised to about 900 p. s. i. with hydrogen. Reduction is carried by timed cycle (about 35 minutes) to precipitate about 1000 lbs. of copper powder.

Reduced slurry is discharged, cooled to about 150° F. and sent to a decantation tank. Settled liquor is sent to a storage tank to be reused in making up leaching liquor. Periodically the settled sludge of copper powder is stirred up to about a 50% solids slurry from which powdered metal is collected by centrifuging the centerfuge mother liquor being sent to the decant recycle storage tank if below about 20 g./l. in zinc and to the zinc removal circuit if too high in zinc. Centrifuged copper powder is washed, dried in a hydrogen atmosphere and sent to storage or shipping. Average properties of the powder product include an apparent density of about 1.4 gm./cc.; a Hall flow rate of about 60 seconds; a screen analysis of about 0.4% plus 80 mesh; 19.4% plus 200 mesh minus 200 mesh and 61.5% minus 325 mesh; and an assay of 99.9+% copper, nil percent zinc and about 0.002% lead. Product powder in storage cannot be practically maintained free from some moisture and some oxygen.

An average typical analysis is:

| | Percent |
|---|---|
| Cu | 99.534 |
| $H_2O$ | 0.214 |
| $O_2$ | 0.248 | which corrected for water and $O_2$ indicates a copper purity of 99.996% Cu.

I claim:

1. In precipitating as elemental metal powder a metal selected from the group consisting of copper, nickel, cobalt and cadmium, by the action of a non-sulfidizing reducing gas at reduction temperatures within a selected elevated temperature range and under superatmospheric pressure, on an aqueous ammoniacal-ammonium salt solution of dissolved salts of said metal, the improved method of providing reduction-promoting solids which comprises: producing in said solution a known dissolved content of said metal such that, at temperatures within said reduction temperature range, said solution is concentrated in but not saturated therewith; bringing into reactive contact in a closed reaction vessel, a slurry comprising a known volume of resultant solution and a finite amount of elemental metal whereby dissolution of said elemental metal is initiated; producing said reduction temperatures in said solution; dissolving a sufficient amount of said elemental metal to saturate said solution in dissolved metal at said reduction temperatures, whereby precipitation of suspended, finely-divided metal oxide is induced; continuing elemental metal dissolution with resultant precipitation of suspended metal oxide only until sufficient metal has dissolved to precipitate a controlled amount of finely-divided suspended metal oxide particles; and with said reducing gas, reducing said suspended oxide in situ to suspended, finely-divided metal particles.

2. In a method of precipitating elemental copper metal powder by the action of a non-sulfidizing reducing gas, at reduction temperatures within a selected elevated temperature range and under superatmospheric pressure, on an aqueous ammoniacal solution of dissolved copper salts, the improved method of providing reduction-promoting solids which comprises: producing in said solution a known dissolved copper content such that, at temperatures within said reduction temperature range, said solution is concentrated in dissolved copper but not saturated therewith; bringing into reactive contact in a closed reaction vessel a slurry comprising a known volume of resultant solution and a finite amount of metallic copper whereby dissolution of said copper is initiated; producing said reduction temperatures in said solutions and dissolving a sufficient amount of said metallic copper to saturate said solution in dissolved copper at said reduction temperatures, whereby precipitation of suspended, finely-divided cuprous oxide is induced; continuing copper dissolution with resultant cuprous oxide precipitation only until sufficient metal has dissolved to precipitate a controlled amount of suspended cuprous oxide; and with said reducing gas, reducing said suspended cuprous oxide in situ to suspended, finely-divided particles of elemental copper powder.

3. A process according to claim 2 in which said cuprous oxide is precipitated in from about two to about ten grams per liter.

4. In a method of precipitating copper metal powder, by the action of a non-sulfidizing reducing gas at reduction temperatures within a selected elevated temperature range and under superatmospheric pressure, on an aqueous ammoniacal solution of dissolved copper salts, the combination therewith of the improvement which comprises: establishing a predetermined volume of ammoniacal copper salt solution which at ambient temperatures contains: a total dissolved copper content more than equivalent to the amount required to saturate said combined solution in dissolved copper at said reduction temperatures, and a cuprous copper content at least in predetermined excess of the amount required to saturate the solution in cuprous copper, at reduction temperature; heating said solution to and maintaining it at said reduction temperatures whereby a finite predetermined amount of the dissolved cuprous copper content is precipitated as suspended finely-divided cuprous oxide; treating resultant cuprous oxide slurry at said reduction temperatures under a positive partial pressure of said reducing gas and a total pressure exceeding that autogenously developed by said slurry at said temperatures, whereby said suspended finely-divided cuprous oxide is reduced in situ to suspended finely-divided particles of copper metal.

5. A process according to claim 4 in which said cuprous oxide slurry initially contains from about 100 to about 150 g./l. of dissolved copper.

6. A process according to claim 4 in which said cuprous oxide slurry contains from about two to about ten g./l. of cuprous oxide.

7. A process according to claim 4 in which said cuprous oxide slurry contains zinc.

8. A process according to claim 4 in which in said slurry the total dissolved copper plus the total dissolved zinc is about 160 g./l., the zinc content not exceeding about 50 g./l.

9. A process according to claim 4 in which said slurry is heated to about 325° F., before being subjected to the action of said reducing gas.

10. A process according to claim 4 in which said reduction temperature range is from about 300° to about 400° F. at which temperature said cuprous oxide slurry initially is substantially saturated in dissolved copper and contains from about two to about ten g./l. of cuprous oxide.

11. In a cyclic method of precipitating copper metal powder by the action of a non-sulfidizing reducing gas at reduction temperatures within a selected elevated temperature range and under superatmospheric reduction pressure on an aqueous ammoniacal-ammonium carbonate solution of dissolved copper salts, said solution having been stabilized and preheated, the combination therewith of the improvement which comprises: at about said reduction temperatures and under reduction pressure, establishing a composite comprising a finite amount of copper metal and a predetermined volume of said aqueous ammoniacal copper salts, said solution containing from about 100 to about 150 g./l. of dissolved copper and having: a total $CO_2$ and $NH_3$ content such that for the total dissolved copper content, said solution is concentrated but not saturated in total copper and in cuprous copper, a cupric copper content at least in stoichiometric excess of said fixed amount of copper metal, whereby said finite amount of copper metal is dissolved, said finite amount of copper metal being that weight of copper which when so-dissolved will saturate said predetermined volume in cuprous copper and precipitate from about two to about ten g./l. of suspended, finely-divided cuprous oxide; maintaining resultant heated cuprous oxide slurry under a positive partial pressure of said reducing and a total pressure exceeding the pressure autogenously developed at said reduction temperatures, whereby said suspended cuprous oxide is reduced in situ to finely-divided suspended particles of copper metal as reduction-promoting solids, and then continuing reduction to produce product copper metal powder.

12. A process according to claim 11 in which said composite contains from about 110–135 g./l. of dissolved copper.

13. A process according to claim 11 in which said composite contains 160–210 g./l. total $NH_3$ and 100–125 g./l. of $CO_2$.

14. A process according to claim 13 in which said composite contains 163–167 g./l. $NH_3$ and 108–112 g./l. $CO_2$.

15. A process according to claim 11 in which said composite contains dissolved zinc and the total dissolved copper plus total dissolved zinc is about 160 g./l., the zinc content not exceeding about 50 g./l.

16. A process according to claim 11 in which said composite is heated to above about 325° F. before being subjected to the action of said reducing gas.

17. A process according to claim 16 in which reduction is carried out at from about 300° F. to about 400° F., at which temperature said copper oxide slurry is substantially saturated in dissolved copper.

18. A process according to claim 11 in which in said composite, the dissolved cupric copper content is stoichiometrically equivalent to that predetermined amount of copper metal which when dissolved at reduction temperature will saturate said composite in cuprous copper and precipitate from about two to about ten grams per liter of suspended cuprous oxide, and said finite amount of copper metal is at least equal to said predetermined amount.

References Cited in the file of this patent

UNITED STATES PATENTS

| | | |
|---|---|---|
| 2,647,831 | Allen et al. | Aug. 4, 1953 |
| 2,727,819 | Kenny et al. | Dec. 20, 1955 |
| 2,733,990 | Van Hare et al. | Feb. 7, 1956 |